United States Patent [19]

Hoshino et al.

[11] Patent Number: 5,041,464

[45] Date of Patent: Aug. 20, 1991

[54] PROCESS FOR PREPARING POLYMER EMULSION PARTICLES HAVING PORES

[75] Inventors: Futoshi Hoshino, Tokyo; Takeshi Yanagihara; Makoto Nakano, both of Kanagawa, all of Japan

[73] Assignee: Mitsui Toatsu Chemicals, Incorporated, Tokyo, Japan

[21] Appl. No.: 457,078

[22] Filed: Dec. 26, 1989

[30] Foreign Application Priority Data

Dec. 27, 1988 [JP] Japan ................................. 63-327873

[51] Int. Cl.$^5$ ............................ C08J 9/28; C08J 9/22; C08J 9/16
[52] U.S. Cl. ........................................ 521/65; 521/57; 521/59; 521/64
[58] Field of Search ........................ 521/57, 59, 64, 65

[56] References Cited

U.S. PATENT DOCUMENTS

| | | | |
|---|---|---|---|
| 4,368,218 | 1/1983 | Senda et al. | 521/59 |
| 4,433,029 | 2/1984 | Senda et al. | 521/57 |
| 4,463,032 | 7/1984 | Asndt et al. | 521/57 |
| 4,594,363 | 6/1986 | Blankenship et al. | 521/64 |
| 4,863,973 | 9/1989 | Chip et al. | 521/57 |
| 4,908,392 | 3/1990 | Kusano et al. | 521/59 |
| 4,920,160 | 4/1990 | Chip et al. | 521/57 |

*Primary Examiner*—John Kight, III
*Assistant Examiner*—John M. Cooney, Jr.
*Attorney, Agent, or Firm*—Millen, White & Zelano

[57] ABSTRACT

A process for preparing polymer emulsion particles having pores therein, an outside diameter D of 0.1 to 5.0 $\mu$, an inside diameter d of 0.05 to 4.0 $\mu$, and a ratio (d/D) of 0.1 to 0.9 in dry condition, comprising the steps of forming core-shell emulsion particles from specific monomers by two-emulsion polymerizations, and swelling the core of the particles with water by hydrolyzing the vinyl acetate part of polymer (A), thereby inducing the hydroxyl groups therein, e.g., using an acidic material or a basic material at 50° to 100° C. The particles when use as a pigment in coating compositions provide excellent converage rate, brightness, gloss and water resistance.

15 Claims, No Drawings

PROCESS FOR PREPARING POLYMER EMULSION PARTICLES HAVING PORES

BACKGROUND OF THE INVENTION a) Field of the Invention

This invention relates to a process for preparing polymer emulsion particles having pores, useful as an additive for coating compositions used as paints and paper coatings and information recording paper.

b) Description of the Prior Art

In recent years, various particulate polymers have been studied for use as additives for coating compositions.

The most commonly used particulate polymer is in the form of homogeneous, emulsion-polymerized polystyrene particles having a diameter of 0.2 to 0.5μ. For example, Japanese Patent Laid Open No. 59741/'84 discloses a process wherein an unsaturated carboxylic acid and a vinyl monomer are copolymerized in the presence of an anionic surface active agent and/or a nonionic surface active agent to form a copolymer emulsion in which more than 90% of the particles have a diameter of 0.20 to 0.28μ. It is also described therein that this copolymer emulsion can be used in applications including paper coatings, paints and similar applications. However, the organic pigment produced by this process fails to provide sufficient hiding power, brightness and gloss. Accordingly, no practical advantage is obtained unless it is used in large amounts.

In recent years, an organic pigment composed of particles having pores, unlike homogeneous and solid particles, has been proposed in order to further improve hiding power, brightness and gloss (U.S. Pat. No. 4,427,836). This patent discloses a process for producing an aqueous dispersion which comprises providing a dispersion of core material formed from a polymer containing at least 5% of an unsaturated carboxylic acid, adding thereto at least one monoethylenically unsaturated sheath monomer to form a sheath polymer, subjecting this monomer to emulsion polymerization, and neutralizing the resulting emulsion with an aqueous volatile base to swell the core particles and thereby form minute openings therein.

When the organic pigment produced by this process is used in paints or paper coating compositions, an improvement in hiding power and brightness is achieved compared with the of organic pigments composed of homogeneous and solid particles. However, gloss is not improved.

Japanese Patent Laid-Open No. 62510/'86 discloses a process for preparing polymer emulsion particles having pores therein, comprising phase separation between the different polymers, and volume shrinkage during polymerization. The organic pigment produced by this process is improved in gloss. However, hiding power and brightness are not improved, because the formed pore is microscopic in size.

SUMMARY OF THE INVENTION

It is an object of the present invention to provide a process to easily prepare polymer emulsion particles having pores therein and a uniform particle size between 0.1 and 5.0μ, and which can meet such required properties as hiding power, brightness and gloss when used in paints, paper coatings, information recording paper and similar applications. Other objects will be apparent to those skilled in the art to which this invention pertains The objects of the present invention are accomplished by providing a process for preparing polymer emulsion particles having pores therein, an outside diameter D of 0.1 to 5.0μ, an inside diameter d of 0.05 to 4.0μ, and a ratio (d/D) of 0.1 to 0.9 in a dry condition, comprising the steps of:

(I) forming a polymer (A) by emulsion polymerization of 2 to 80 parts by weight of vinyl acetate and 98 to 20 parts by weight of another vinyl monomer (a) which is copolymerizable therewith;

(II) forming core-shell emulsion particles whose shell (outer layer) is comprised of a polymer (B) by the emulsion polymerization of 95 to 30 parts by weight of a vinyl monomer (b) while using 5 to 70 parts by weight of the polymer (A) as core particles; and (III) swelling the core of the particles with water by hydrolyzing the acetate groups of the vinyl acetate moieties of polymer (A), thereby forming hydroxyl groups therein, e.g., under mildly acidic or basic conditions at 50° to 100° C.

Further, the objects of the present invention are accomplished by providing a process for preparing polymer emulsion particles having pores therein, an outside diameter D of 0.1 to 5.0μ, an inside diameter d of 0.05 to 4.0μ, and a ratio (d/D) of 0.1 to 0.9 in a dry condition, comprising the step of hydrolyzing the acetate moieties of a particulate vinyl acetate emulsion polymerized copolymer having a 2 to 80 parts by weight vinyl acetate content, which copolymer particles are the cores of core-shell particles and constitute 5 to 70 parts by weight of thereof, the shell of the particles being a polymer which is resistant to hydrolysis of a vinyl monomer emulsion polymerized onto the surface of the copolymer particles, thereby swelling the core particles and forming a pores therein.

DESCRIPTION OF THE PREFERRED EMBODIMENTS

This invention is based on the discovery that organic pigments with improved hiding power and brightness can be produced using as an additive an emulsion particles having pores produced by the process of this invention, which in a preferred embodiment is a succession of three steps in the first of which a hydrolyzable vinyl acetate copolymer is produced to form the core particles, shells of particles is then emulsion polymerized, and the acetate groups in the core copolymer are then hydrolyzed to form pores in the particles.

Vinyl monomer (a), which is other than vinyl acetate, is substantialy non-functional. Examples of such a vinyl monomer (a), which can be used to forming the core particles composed of polymer (A), include simple, e.g., esters of α-unsaturated acids, such as (meth)acrylic esters, e.g., methyl (meth)acrylate, ethyl (meth)acrylate and butyl (meth)acrylate; aromatic vinyl compounds such as substituted and unsubstituted vinyl benzenes, e.g., styrene, α-methylstyrene and vinyltoluene; α-unsaturated nitriles; vinyl cyano compounds such as (meth)acrylonitrile; halogenated vinyl compounds such as vinyl chloride and vinylidene chloride; and similar monomers.

In order to impart various stabilizing properties to the emulsion, one or more functional monomers may also be used to form polymer (A). Examples of the functional monomers include unsaturated carboxylic acids such as (meth)acrylic acid, crotonic acid and itaconic acid; unsaturated sulfonates such as sodium styrenesulfonate; unsaturated bases such as dimethylaminoethyl methacrylate; (meth)acrylates such as 2-hydroxyethyl (meth)acrylate and glycidyl (meth)acrylate; (meth)acrylamide; N-methylol (meth)acrylamide; and similar monomers.

The vinyl acetate is used in an amount of 2 to 80 parts by weight, preferably 5 to 50 parts by weight and more preferably 10 to 30 parts by weight of total monomers to form copolymer (A). A preferred class of polymer (A) is formed from vinyl acetate, one or both of butyl acetate and methyl methacrylate, a small amount (less than 10 parts) of at least one and preferably at least two of acrylonitrile and either acrylic acid or dimethylaminoethyl methacrylate, and up to about 5 parts of acrylamide. In order to form the core-shell emulsion particles comprised of polymer (A) as the core and polymer (B) as the shell (outer layer), followed by swelling the core of the particles with water by hydrolyzing the vinyl acetate part of polymer (A) as described as follows.

If the amount used is less than 2 parts by weight of total monomers, the emulsion particles will not be fully swollen with water by hdyrolyzing and, therefore, pores will not appear within the dried particles. If the amount is greater than 80 parts by weight, it will be difficult to form the shell of polymer (B) on the surface of the core particle of polymer (A).

The preparation of the copolymer (A) which will serve as core particles is carried out according to conventional emulsion polymerization techniques. The surface active agent used in the polymerization is one or more compounds selected from anionic surface active agents, such as sodium alkylbenzenesulfonate, sodium alkylsulfate, sodium dialkylsulfosuccinate and naphthalenesulfonic acid-formalin condensate; and nonionic surface active agents such as polyoxyethylene alkyl ether, polyoxyethylene alkylphenol ether, ethylene oxide-propylene oxide block copolymer and sorbitan fatty acid ester.

Although the amount of surface active agent used is not critical, it is usually used in an amount of about 0.1 to 10 percents by weight of all monomers.

As the polymerization initiator, there may be used any of the various polymerization initiators that are commonly used in emulsion polymerization. Useful polymerization initiators include, for example, persulfates such as potassium persulfate, sodium persulfate and ammonium persulfate; organic peroxides such benzoyl hdyroperoxide; and azo compounds such as azobisisobutyronitrile. If desired, they can also be used as redox initiators by combining them with a reducing agent.

In order to prevent the vinyl acetate from hydrolyzing during polymerization, a buffer such as sodium hydrogencarbonate may typically be used in an amount of 0.1 to 0.5 weight percent of total monomers.

In the preparation of the core particles, the polymerization is carried out by adding the several monomers dropwise, all at once, in portions or continuously, to a reaction medium containing the aforesaid polymerization initiator, surface active agent and buffer. This polymerization is usually carried out at a temperature of 20° to 90° C. in a nitrogen atmosphere.

In forming the shell on the particles, the polymerization is carried out by adding 95 to 30 parts by weight of vinyl monomer (b), optionally containing a crosslinkable monomer dropwise, all at once, in portions or continuously, to the emulsion containing 5 to 70 parts by weight of core particles comprised polymer (A).

The ratio of polymer (B) to the total amount of polymer (A) and polymer (B) is 95 to 30 percent by weight, preferably 90 to 40 percent by weight, more preferably 80 to 50 percent by weight.

If the ratio of polymer (B) is greater than 95 percent by weight, it will be difficult to hdyrolyze the core. In that case, emulsion particles having pores will not be obtained even if the cores are hydrolyzed. If the ratio is less than 30 percent by weight, the shell of the particle will not completely cover the surface of the core, whereby the particles will be deformed when hydrolyzed. In that case, the desired particles will not be obtained.

Examples of useful vinyl monomer (b), which includes as described above, is for example, aromatic vinyl compounds such as styrene, α-methylstyrene and vinyltoluene; (meth)acrylic esters such as methyl (meth)acrylate, ethyl (meth)acrylate and butyl (meth)acryalte; vinyl cyano compounds such as (meth)acrylonitrile; and halogenated vinyl compound such as vinyl chloride and vinylidene chloride.

In order to impart various stabilizing properties to the emulsion, one or more functional monomers, which is copolymerizable with the monomers, may also be used. Examples of the functional monomers include unsaturated carboxylic acids such as (meth)acrylic acid, crotonic acid and itaconic acid; unsaturated sulfonates such as sodium styrenesulfonate; unsaturated bases such as dimethylaminoethyl methacrylate; (meth)acrylates such as 2-hydroxyethyl (meth)acrylate and glycidyl (meth)acrylate; (meth)acrylamide; and N-methylol (meth)acrylamide. The functional monomers are preferably used in an amount of no more than 20 percent by weight, more preferably no more than 10 percent by weight of the monomer (b). If the amount of the functional monomer is more than 20 percent by weight, the water resistance of the particles is reduced, and new particles lacking a core of polymer (A) tend to be produced. The optionally used crosslinkable monomer is copolymerizable with the above-described monomer. Useful crosslinkable monomers include monomers having two or more polyemerizable unsaturated bonds in the molecule, such as divinylbenzene, ethylene glycol di(meth)acrylate, and trimethylolpropane trimethacrylate. Where the aforesaid crosslinkable monomer is used, the amount should not be greater than 5 percent by weight, preferably not be greater than 2 percent by weight, of the vinyl monomer. Use of a crosslinkable monomer improves in blocking resistance, thermal resistance and solvent resistance. However, if the amount thereof exceeds 5 parts by weight, hydrolyzing the acetate groups of the vinyl acetate portion of the copolymer (A) accompanied by the swelling the core with water described below are adversely affected. The monomers described above may be combined without restriction. A prefered class of polymer (B) is formed from styrene, up to about 50% by weight of butyl methacrylate or up to about 30% by weight of methyl methacrylate, a lesser amount (up to about 10% by weight of the other monomers used to produce polymer (B)) of either dimethylaminoetyl methacrylate or acrylic acid, plus a small proportion (less than 10% by weight) of the other monomers of acrylamide.

The glass transition temperature obtained from the one or more monomers is preferably 50° C. or above and more preferably 70° C. or above. After polymerization, the core portion of the emulsion particles thus obtained is hydrolyzed to produce the desired polymer emulsion particles having pores. The shell portion of the particles provided by polymer (B) should not be hydrolyzed during the hydrolysis treatment. Therefore, polymer (B) should be resistant to hydrolysis. Viewed from this point, aromatic vinyl monomers such as styrene are preferably used to produce polymer (B).

The basic or acidic material used in the hydrolysis treatment includes, for example, inorgnic basic materials such as alkaline hydroxides, e.g., potassium hydroxide and sodium hydroxide; volatile basic materials such as ammonia; organic basic materials such as dimethylethanolamine and triethylamine; inorganic acidic materials such as mineral acids, e.g., hydrochloric acid; and organic acidic materials such as Bronsted acids, e.g., acetic acid.

In the hydrolysis treatment, the pH of the emulsion should not be less than pH 8 or more than pH 3. When an ester of an unsaturated acid is used as the functional monomer, a basic material preferably is used in the hydrolysis treatment in view of the stability of the emulsion. When a derivatives of an unsaturated base is used as the functional monomer, an acidic material preferably is used.

The temperature of the hydrolysis treatment ordinarly is 50° to 100° C., preferably 70° to 98° C., more preferably 80° to 95° C. If the temperature of the hydrolysis treatment is less than 50° C., the shell may not be sufficiently plasticized, in which case the hydrolysis and swelling of the core does not occur, in which case, the desired particles are not obtained.

The treated emulsion particles are dried to vaporize the water therein, whereby polymer emulsion particles having pores within are formed. The existence of pores in the particles can be confirmed by optical or electron microscopic observation. For example, the dried particles, may be dipped in hydrocarbon oil having a refraction index of 1.48. If a pore exists in the particle, a black contour of the particle can be observed by optical microscope, which is caused by the difference of refraction index between air within the particle and the hydrocarbon oil. If homogeneous particles having no pores are dipped in the oil, it is difficult to find the particles because there is very little different in the refraction index of the polymeric particles and the oil.

After it is confirmed that the shape of the particle is a sphere, the outside diameter and inside diameter of the particle having pores therein by a scanning electron microscope can be measured by observing the light and shade in the particle through a transmission electronic microscope.

The polymer emulsion particles having pores therein prepared according to process of this invention have an outside diameter D of 0.1 to 5.0$\mu$, an inside diameter d of 0.05 to 4.0$\mu$ and a ratio (d/D) of 0.1 to 0.9. With respect to from the sufficient hiding power, brightness and gloss when used in an organic pigment, an outside diameter D of 0.3 to 1.0$\mu$ and a ratio (d/D) of 0.2 to 0.8 are preferred. Particles having an outside diameter of less than 0.1$\mu$ connot be used as an organic pigment because of the poor hiding power and brightness, even if it has a pore. Particles having an outside diameter of more than 5$\mu$ cannot stably be prepared. Particles having a (d/D) of less than 0.1 do not achieve the improvement the above properties caused the pores, and one having (d/D) of more than 0.9 are not practical in use because of their poor by a mechanical strength.

The ratio (d/D) of the particles are determined by the extent of swelling the core with water in hydrolysis treatment, i.e. the higher the proportion of vinyl acetate which is used and the more extensive the hydrolysis thereof, the higher the ratio.

The outside diameter of the particle is increased by the swelling the core in the hydrolysis treatment discribed above. It is also increased by decreasing the ratio (percent by weight) of polymer (A) to total polymers (A) and (B).

When used as a pigment or filler for paints and paper coating colors, the polymer particles having pores of the present invention provide excellent converage rate (hiding power), brightness, gloss, water resitance and other properties, due to their morphological features. In these applications, titanium dioxide, kaolin clay and calcium carbonate can be wholly or partially replaced by the polymer particles of the present invention.

In addition, the polymer particles of the present invention are effective in saving weight and improving hardness, abrasion resistance, thermal resistance and other properties. Accordingly, they can be used as an additive for various compositions and applied to paper, metals, plastics, fibers, cloth and other materials.

The present invention is further illustrated by the following examples, but is not restricted only to those examples. In the example, all parts and percentages are by weight.

EXAMPLE 1

A separable flask fitted with a stirrer, a thermometer and a reflux condenser was charged with 350 parts of water and 1.5 parts of sodium hydrogencarbonate. The contents of the flask were heated to 70° C. with stirring in a nitrogen atmosphere. While the internal temperature was maintained at 70° C., 3.0 parts of potassium persulfate was added to the flask as a polymerization initiator. After the dissolution thereof, reaction was carried out by continuously injecting into the solution over a period of 3 hours, a monomer emulsion prepared in advance by adding with stirring 40 parts of vinyl acetate, 140 parts of butyl acrylate, 15 parts of acrylonitrile, 2 parts of acrylic acid and 3 parts of acrylamide to 150 parts of water and 0.6 part of sodium lauryl sulfate. After completion of the injection, the reacted mixture was aged for an hour.

The next, emulsion polymerization was carried out by continuously injecting into the aged mixture over a period of 4 hours, a monomer emulsion prepared in advance by adding with stirring 300 parts of styrene, 80 parts of butyl methacrylate, 12 parts of acrylic acid and 8 parts of acrylamide to 300 parts of water and 4 parts of sodium lauryl sulfate.

After completion of the injection, the reacted mixture was aged for 2 hours.

After completion of the second polymerization, 40.8 parts of 20% sodium hydroxide was added to the emulsion with stirring, to raise the pH value of the emulsion to 10.1. The emulsion was then continuously heated to 90° C. and maintained with stirring for 3 hours.

The thus obtained emulsion had a nonvolatile solids content of about 42%, a viscosity of 80 centipoises as measured at 25° C. with a BM type viscometer (No. 1 rotor; rotational speed 60 rpm), and a pH of 9.3. When observed by electron microscopy, the emulsion particles had pores therein, an outside diameter D of 0.53μ, an inside diameter d of 0.28μ and a ratio (d/D) of 0.53.

EXAMPLES 2-6

Emulsion particles of Examples 2-6 having pores therein were prepared in the same manner as described in Example 1, except that the amount of vinyl acetate, polymer (A)/polymer (B) weight ratio, monomer composition and the kinds of basic and acidic materials were varied, as shown in Table 1.

COMPARATIVE EXAMPLE 1

Polymerization and hydrolysis treatment were conducted in the same manner as described in Example 1, except the vinyl acetate was replaced with butyl acrylate to form polymer (A).

The emulsion thus obtained had a nonvolatile solids content of about 42%, a viscosity of 61 cps and a pH of 10.0. The particles did not have pores therein like those of Example 1, but instead were homogeneous and spherical particles having an average particle size of 0.43μ.

COMPARATIVE EXAMPLES 2-3

In Comparative Example 2, the emulsion was prepared in the same composition and manner as described in Example 1, except the hydrolysis reaction was conducted at 30° C. for 5 hours. In Comparative Example 3, the emulsion was prepared in the same manner as described in Example 1, except that the core-shell particle had a composition ratio of polymer (A) and polymer (B) of 97 weight percent of polymer (B).

APPLICATION EXAMPLE 1 (USE IN PAINTS)

The particles having pores therein obtained in Examples 1-6 and the homogeneous particles obtained in Comparative Examples 1-3 were used as an organic pigment in place of a portion of the rutile titanium dioxide in a paint formulations. As the paint vehicle, an acrylic emulsion having a solid resin content of 45% (Almatex E-208) was used.

The paint formulations employed are shown in Table 2.

Paints were prepared by charging water, Tamol 731, ethylene glycol, 2-amino-2-methylpropanol, Nopco DF-122NS and rutile titanium dioxide into a pigment dispersion mill and grinding them well. Each of the particles obtained in the foregoing Examples and Comparative Examples, Almatex E-208, butyl cellosolve/Texanol and hydroxyethyl cellulose/propylene glycol were then added to the thus-obtained dispersion with stirring. Finally, the viscosity of the paints was adjusted to 70–80 KU with the aid of a Stormer viscometer.

The paints so prepared were applied to slates so as to give a dry film thickness of about 40μ, and dried at room temperature for one week. Then their performance was evaluated.

Evaluation procedures

Gloss: Measured at an angle of 60° with a gloss meter (manufactured by Suga Testing Machine Co.).

Hiding power: Evaluated according to JIS K-5663 as follows. Using an applicator, the paint to be tested was applied to a sheet of hiding power test paper (manufactured by Japan Test Panel Industrial Co.) so as to give a dry film thickness of 75μ, and dried at room temperature for one week. Then its hiding power was calculated from the 45°/0° reflectance ratio.

Water resistance: Evaluated according to JIS K-5663 and judged to be good (◯) when no abnormalities such as blistering or loss in gloss were observed.

Alkali resistance: As above.

Weather resistance: Judged to be good (◯) when no abnormalities such as blistering, whitening or loss in gloss were observed after irradiation in a weather meter for 500 hours.

Washability: Evaluated according to JIS K-5663. Judged to be good (◯) when the paint film did not peel off even after being washed more than 2,000 times, and fair (Δ) when the paint film peeled off after being washed 1,000–2,000 times.

Adherence: Judged to be good (◯) when the paint film was not stripped at a crosscut, and fair (◯) when the paint film was slightly stripped at a crosscut.

The results this obtained are shown in Table 3.

APPLICATION EXAMPLE 2 (USE IN PAPER COATING)

The performance of the emulsions obtained in Examples 1-6 and Comparative Examples 1-3 was evaluated by using each of them as an organic pigment or filler in a paper coating fluid.

The formulation and the evaluation procedures were as follows:

| (Formulation) | |
|---|---|
| Ingredient | Parts |
| UW-90 (manufactured by EMC Co.) | 90 |
| Pigment or filler | 10 |
| Aron T-40 (a dispersant manufactured by Toagosei Chemical Industry Co.) | 0.09 |
| MS-4600 (Manufactured by Nippon Food Industrial Co.) | 3 |
| Polylac 755 (SBR latex: manufactured by Mitsui-Toatsu Chemicals Co.) | 12 |
| (The solids content of the coating composition was 62%.) | |

Coating colors were prepared by adding the dispersant Aron T-40 with a solid content of 40% to water, dispersing Kaolin Clay UM-90 well thereinto by means of a Kaules mixer, and then adding thereto one of the emulsions obtained in Examples 1-6 and Comparative Examples 1-3 as an organic pigment. For purposes of comparison, Titanium Dioxide Paste with a solid content of 62% (manufactured by Dainichi Seika K.K.) was used as an inorganic pigment, and Precipitated Calcium Carbonate Slurry TP-222HS with a solid content of 60% (manufactured by Okutama Industrial Co.) as an inorganic filler. Finally Phosphated Starch MS-4600 and Polylac 755 with a solid content of 50% were added as binders to obtain coating colors.

Using an application, each of the aforesaid coating colors was applied to woodfree paper so as to give a dry pickup of about 14–15 g/m$^2$ and then dried at 120° C. for 20 seconds. Thereafter, using a roll temperature of 60° C., a linear pressure of 70 kg/cm and a speed of 10 m/min, the paper was passed twice through calender rolls to obtain coated paper, and its performance was evaluated.

Evaluation procedures

Color viscosity: Measured with a BM type viscometer (60 rpm; No. 4 rotor).

Gloss: 75o reflectance was measured according to JIS P-8142.

Printed gloss: Using an RI printing tester, each paper was printed with 0.4 cc of New Bright Indigo (manufactured by Toyo Ink Co.). After drying, its 75° reflectance was measured according to JIS P-8142.

Brightness: Measured with a Hunter brightness meter according to JIS P-8123.

Opacity: Measured according to JIS P-8138.

Dry pick: Tested with an RI printing tester on the basis of 10 points.

Wet pick: Tested with an RI printing tester on the basis of 10 points.

The results thus obtained are shown in Table 4.

TABLE 1

| Raw materials | Example | | | | | | Comparative Example | | |
|---|---|---|---|---|---|---|---|---|---|
| | 1 | 2 | 3 | 4 | 5 | 6 | 1 | 2 | 3 |
| First-step polymerization | | | | | | | | | |
| VAc | 40 | 20 | 60 | 40 | 60 | 50 | | 40 | 0.4 |
| BA | 140 | 120 | 80 | 100 | | | 180 | 140 | 14 |
| MMA | | | 35 | 52 | 40 | 130 | 190 | | |
| AN | 15 | 20 | | 10 | | 5 | 15 | 15 | 1.5 |
| AAc | 2 | 2 | 4 | 6 | | 2 | 2 | 2 | 0.2 |
| DMAEMA | | | | | 2 | | | | |
| AAm | 3 | 3 | 4 | 4 | 8 | 3 | 3 | 3 | 0.3 |
| NaLS | 0.6 | 1.2 | 0.1 | 0.3 | 0.3 | 1.5 | 0.6 | 0.6 | 0.06 |
| Second-step polymerization | | | | | | | | | |
| St | 300 | 350 | 250 | 450 | 287 | 300 | 300 | 300 | 435 |
| BMA | 80 | | 125 | | | 30 | 80 | 80 | 116 |
| MMA | | 35 | | 30 | | | | | |
| AAc | 12 | 8 | 15 | 8 | | 10 | 12 | 12 | 17.4 |
| DMAEMA | | | | | 3 | | | | |
| AAm | 8 | 7 | 10 | 9 | 10 | 10 | 8 | 8 | 11.6 |
| DVB | | | | 3 | | | | | |
| NaLS | 4 | 4 | 5 | 6 | 5 | 5 | 4 | 4 | 5.8 |
| Hydrolysis treatment | | | | | | | | | |
| 20% NaOH | 40.8 | 40.0 | 4.17 | | | | 40.8 | 40.5 | 41.0 |
| 28% aqueous ammonia | | | | 15.0 | | 15.2 | | | |
| 20% HCl | | | | | 28.3 | | | | |
| pH | 10.1 | 10.0 | 10.5 | 9.9 | 2.0 | 10.1 | 10.0 | 10.1 | 10.1 |
| (°C.) | 90 | 90 | 95 | 90 | 85 | 90 | 90 | 30 | 90 |
| (hr) | 3 | 3 | 4 | 4 | 5 | 4 | 3 | 5 | 5 |
| Non-volatiles (%) | 42 | 42 | 42 | 46 | 38 | 42 | 42 | 42 | 42 |
| pH | 9.3 | 9.5 | 9.6 | 8.2 | 1.8 | 9.7 | 9.8 | 9.9 | 10.0 |
| Viscosity (cps) | 80 | 98 | 69 | 74 | 66 | 82 | 61 | 60 | 49 |
| Outside diameter D (μ) | 0.53 | 0.39 | 0.91 | 0.51 | 0.44 | 0.41 | 0.43 | 0.41 | 0.89 |
| Inside diameter d (μ) | 0.28 | 0.14 | 0.62 | 0.16 | 0.11 | 0.20 | — | — | — |
| (d/D) | 0.53 | 0.36 | 0.68 | 0.31 | 0.25 | 0.4 | — | — | — |

Note:
VAc = vinyl acetate, BA = butyl acrylate; MMA = methyl methacrylate,
AN = acrylonitrile, St = styrene, BMA = Butyl methacrylate, AAc = acrylic acid,
DMAEMA = dimethylaminoethyl methacrylate, AAm = acrylamide, DVB = divinylbenzene,
NaLS = sodium lauryl sulfate.

TABLE 2

| Ingredient | Parts |
|---|---|
| Water | 45.0 |
| 25% aqueous solution of Tamol 731 (a dispersant manufactured by Rohm and Haas Co.) | 12.2 |
| Ethylene glycol | 40.0 |
| 2-Amino-2-methylpropanol | 3.0 |
| Nopco DF-122NS (an anti-foaming agent manufactured by Sun Nopco Co.) | 0.8 |
| Rutile titanium dioxide | 164.5 |
| Prepared emulsion (40%) | 102.8 |
| Almatex E-208 (an acrylic emulsion manufactured by Mitsui-Toatsu Chemicals Co.) | 676.0 |
| Solvent mixture composed of 1 part of butyl cellosolve and 2 parts of texanol | 40.0 |
| Mixture composed of 1 part of hydroxyethyl cellulose and 10 parts of propylene glycol | 12.4 |

The paint had a solid content of 46.9%, a pigment content of 40.0% by weight based on the solid matter contained therein, and a viscosity of 70-80 KU.

TABLE 3

| Application Example No. | Fine particle emulsion | TiO$_2$/emulsion particles (W/W) | Gloss | Hiding power (%) | Water resistance | Alkali resistance | Weather resistance | Washability | Adherence |
|---|---|---|---|---|---|---|---|---|---|
| Example | | | | | | | | | |
| 1-1 | 1 | 80/20 | 88 | 98 | ○ | ○ | ○ | ○ | ○ |
| 1-2 | 2 | 80/20 | 89 | 96 | ○ | ○ | ○ | ○ | ○ |
| 1-3 | 3 | 80/20 | 87 | 98 | ○ | ○ | ○ | ○ | ○ |
| 1-4 | 4 | 80/20 | 89 | 96 | ○ | ○ | ○ | ○ | ○ |
| 1-5 | 5 | 80/20 | 89 | 93 | ○ | ○ | ○ | ○ | ○ |
| 1-6 | 6 | 80/20 | 89 | 97 | ○ | ○ | ○ | ○ | ○ |
| Comparative | | | | | | | | | |

TABLE 3-continued

| Application Example No. | Fine particle emulsion | TiO2/emulsion particles (W/W) | Gloss | Hiding power (%) | Water resistance | Alkali resistance | Weather resistance | Washability | Adherence |
|---|---|---|---|---|---|---|---|---|---|
| Example | | | | | | | | | |
| 1-8 | 1 | 80/20 | 84 | 90 | ○ | ○ | ○ | ○ | ○ |
| 1-9 | 2 | 80/20 | 82 | 90 | ○ | ○ | ○ | ○ | ○ |
| 1-10 | 3 | 80/20 | 81 | 89 | ○ | ○ | ○ | ○ | ○ |
| 1-11 | — | 100/0 | 80 | 99 | ○ | ○ | ○ | ○ | ○ |

TABLE 4

| Application Example No. | Pigment or filler | Color viscosity (cp) | Gloss | Printed gloss paper | Brightness | Opacity | Dry pick | Wet pick |
|---|---|---|---|---|---|---|---|---|
| Example | | | | | | | | |
| 2-1 | 1 | 1680 | 79.8 | 93.8 | 81.2 | 96.3 | 8 | 8 |
| 2-2 | 2 | 1700 | 80.0 | 94.1 | 80.7 | 95.9 | 7 | 8 |
| 2-3 | 3 | 1690 | 79.5 | 93.7 | 81.0 | 96.3 | 7 | 9 |
| 2-4 | 4 | 1650 | 79.8 | 93.9 | 80.6 | 95.8 | 7 | 8 |
| 2-5 | 5 | 1690 | 80.0 | 94.0 | 80.3 | 95.2 | 7 | 8 |
| 2-6 | 6 | 1690 | 79.9 | 93.9 | 80.9 | 96.0 | 7 | 8 |
| Comparative Example | | | | | | | | |
| 2-8 | 1 | 1710 | 77.9 | 89.7 | 78.1 | 94.2 | 7 | 8 |
| 2-9 | 2 | 1660 | 78.0 | 90.2 | 78.0 | 94.1 | 7 | 8 |
| 2-10 | 3 | 1670 | 75.4 | 89.3 | 78.2 | 93.8 | 8 | 8 |
| 2-11 | Titanium dioxide | 1820 | 71.3 | 88.7 | 81.9 | 97.1 | 8 | 9 |
| 2-12 | Calcium carbonate | 1220 | 69.8 | 88.3 | 77.5 | 93.9 | 8 | 9 |

What is claimed is:

1. A process for preparing polymer emulsion particles having pores therein, an outside diameter D of 0.1 to 5.0μ, an inside diameter d of 0.05 to 4.0μ, and a ratio (d/D) of 0.1 to 0.9 in a dry condition, comprising the steps of:
  (I) forming a polymer (A) by emulsion polymerization of 2 to 80 parts by weight of vinyl acetate and 98 to 20 parts by weight of another vinyl monomer (a) which is copolymerizable therewith selected from the group consisting of (meth)acrylic esters, aromatic vinyl monomers, vinyl cyano monomers and halogenated vinyl monomers;
  (II) forming core-shell emulsion particles whose shell comprises a polymer (B) by the emulsion polymerization of 95 to 30 parts by weight of a vinyl monomer (b) while using 5 to 70 parts by weight of polymer (A) as core particles; and
  (III) swelling the core of the particles with water by hydrolyzing the acetate groups of the vinyl acetate moieties of polymer (A), thereby forming the hydroxyl groups therein.

2. A process for preparing polymer emulsion particles having pores therein, an outside diameter D of 0.1 to 5.0μ, an inside diameter d of 0.05 to 4.0μ, and a ratio (d/D) of 0.1 to 0.9 in a dry condition, comprising the steps of:
  (I) forming a polymer (A) by emulsion polymerization of 2 to 80 parts by weight of vinyl acetate and 98 to 20 parts by weight of another vinyl monomers (a) which is copolymerizable therewith;
  (II) forming core-shell emulsion particles whose shell comprises a polymer (B) by the emulsion polymerization of 95 to 30 parts by weight of a vinyl monomer (b) selected from the group consisting of (meth)acrylic esters, aromatic vinyl monomers, vinyl cyano monomers and halogenated vinyl monomers while using 5 to 70 parts by weight of polymer (A) as core particles; and
  (III) swelling the core of the particles with water by hydrolyzing the acetate groups of the vinyl acetate moieties of polymer (A), thereby forming the hydroxyl groups therein.

3. The process of claim 1 wherein vinyl monomer (b) is an aromatic vinyl compound.

4. The process of claim 1 wherein the amount of vinyl acetate used is 5 to 50 parts by weight of monomers used to produce polymer (A).

5. The process of claim 1 wherein the glass transition temperature of polymer (B) is at least 50° C.

6. The process of claim 1 wherein the pH of the thus-produced emulsion is not less than pH 8 or more than pH 3.

7. The process of claim 1 wherein the hydrolysis is conducted at temperature of 70° to 98° C.

8. The process of claim 1 wherein the particle have an outside diameter D of 0.3 to 1.0μ and a ratio (d/D) of 0.2 to 0.8.

9. A process for preparing polymer emulsion particles having pores therein, an outside diameter D of 0.1 to 5.0μ, an inside diameter d of 0.05 to 4.0μ, and a ratio (d/D) of 0.1 to 0.9 in a dry condition, comprising the steps of:
  (I) forming a polymer (A) by emulsion polymerization of 5 to 50 parts by weight of vinyl acetate and 95 to 50 parts by weight of another vinyl monomer (a) selected from the group consisting of (meth)acrylic esters, aromatic vinyl monomers, vinyl cyano monomers and halogenated vinyl monomers;
  (II) forming core-shell emulsion particles whose shell is comprised of a polymer (B) by the emulsion polymerization of 95 to 30 parts by weight of a vinyl monomer (b) selected from the group consisting of aromatic vinyl monomers, (meth)acrylic esters, vinyl cyano monomers and halogenated vinyl monomers; and (III) swelling the core of the particles with water by hydrolyzing the acetate groups of the vinyl acetate moieties of polymer (A), thereby forming the hydroxyl groups therein.

10. The process of claim 2 wherein vinyl monomer (b) is an aromatic vinyl compound.

11. The process of claim 2 wherein the amount of vinyl acetate used is 5 to 50 parts by weight of monomers used to produce polymer (A).

12. The process of claim 2 wherein the glass transition temperature of polymer (b) is at least 50° C.

13. The process of claim 2 wherein the pH of the thus-produced emulsion is not less than pH 8 or more than pH 3.

14. The process of claim 2 wherein the hydrolysis is conducted at temperature of 70° to 98° C.

15. The process of claim 2 wherein the particles have an outside diameter D of 0.3 to 1.0μ and a ratio (d/D) of 0.2 to 0.8.

* * * * *